G. A. AND S. A. DOBYNE.
FASTENER FORMING MECHANISM FOR FASTENER INSERTING MACHINES.
APPLICATION FILED SEPT. 18, 1913.

1,377,759.

Patented May 10, 1921.
4 SHEETS—SHEET 3.

ATTEST:
Chas. A. Becker
O. Groebl Jr.

INVENTORS:
George A. Dobyne and Stephen A. Dobyne.
by John H. Bruninga
THEIR ATTORNEY.

G. A. AND S. A. DOBYNE.
FASTENER FORMING MECHANISM FOR FASTENER INSERTING MACHINES.
APPLICATION FILED SEPT. 18, 1913.
1,377,759.
Patented May 10, 1921.
4 SHEETS—SHEET 4.
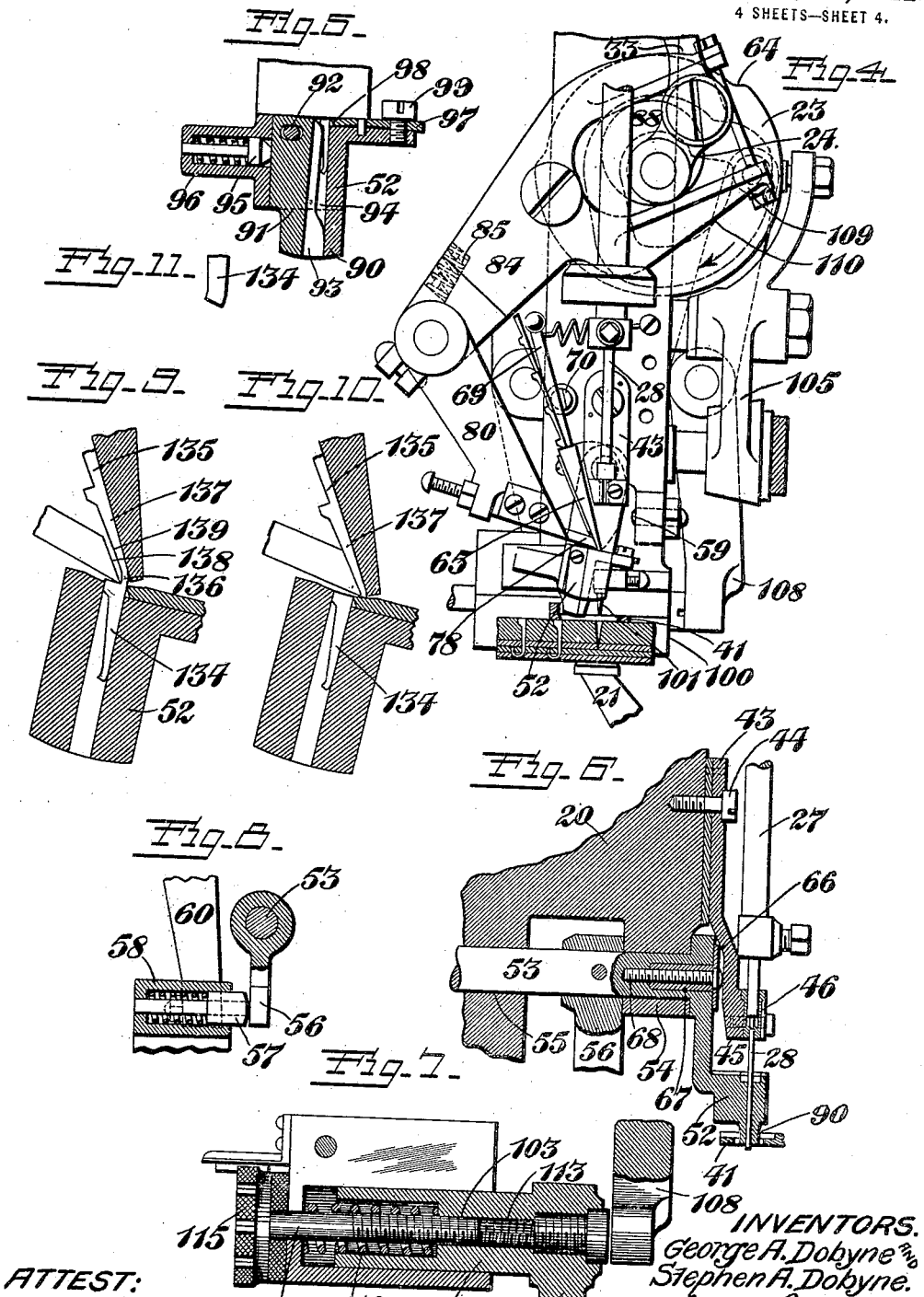
INVENTORS.
George A. Dobyne and
Stephen A. Dobyne.
ATTEST:
Chas. A. Becker
O. Groebl Jr.
by John H. Bruninga
THEIR ATTORNEY.

UNITED STATES PATENT OFFICE.

GEORGE A. DOBYNE AND STEPHEN A. DOBYNE, OF ST. LOUIS, MISSOURI, ASSIGNORS TO CHAMPION SHOE MACHINERY COMPANY, OF ST. LOUIS, MISSOURI, A CORPORATION OF MISSOURI.

FASTENER-FORMING MECHANISM FOR FASTENER-INSERTING MACHINES.

1,377,759. Specification of Letters Patent. Patented May 10, 1921.

Original application filed October 8, 1912, Serial No. 724,680. Divided and this application filed September 18, 1913. Serial No. 790,414.

*To all whom it may concern:*

Be it known that we, GEORGE A. DOBYNE and STEPHEN A. DOBYNE, citizens of the United States, and residing at St. Louis, in the State of Missouri, have invented certain new and useful Improvements in Fastener-Forming Mechanism for Fastener-Inserting Machines, of which the following is a specification.

This invention relates to fastener forming mechanisms, and more particularly to fastener forming mechanisms for fastener inserting machines. This application is a division of our application Serial No. 724,680, filed October 8, 1912, Patent No. 1,091,298 March 24, 1914.

In certain classes of work, such for instance as the attachment of soles to shoes, it is necessary that the nails be clenched in a predetermined direction so as to form an operative and saleable article. In machines used for attaching soles to shoes it is necessary to use a clenching anvil having an anvil cup forming a segment of a sphere. Now while such an anvil will clench a nail, it will not accurately clench it in a predetermined direction.

One of the objects of this invention therefore is to construct a machine in which the nail will be formed in such a manner as to cause it to clench in a predetermined direction when driven and clenched by a clenching anvil.

Further objects will appear from the detail description taken in connection with the accompanying drawings, in which:

Fig. 4 is a view similar to Fig. 1, but showing the mechanism in another position.

Fig. 5 is a section on the line 5—5 Fig. 2,

Fig. 6 is a section on the line 6—6 Fig. 1,

Fig. 7 is a section on the line 7—7 Fig. 3,

Fig. 8 is a section on the line 8—8 Fig. 2,

Figs. 9 and 10 are diagrammatical views illustrating the operation of the machine in cutting off a fastener and forming the point thereon, and Fig. 11 is an enlarged view of the point of a fastener as formed in this machine.

Figure 1:
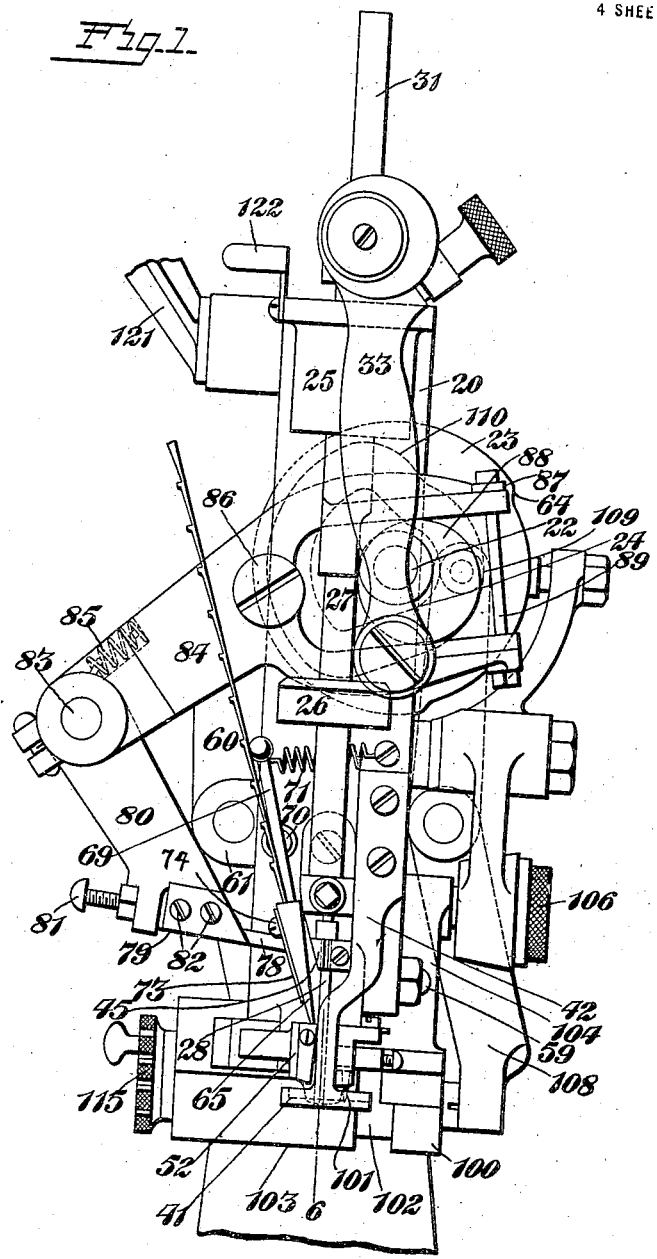
Figure 1 is a front elevation of a machine head embodying this invention.
Figure 2:
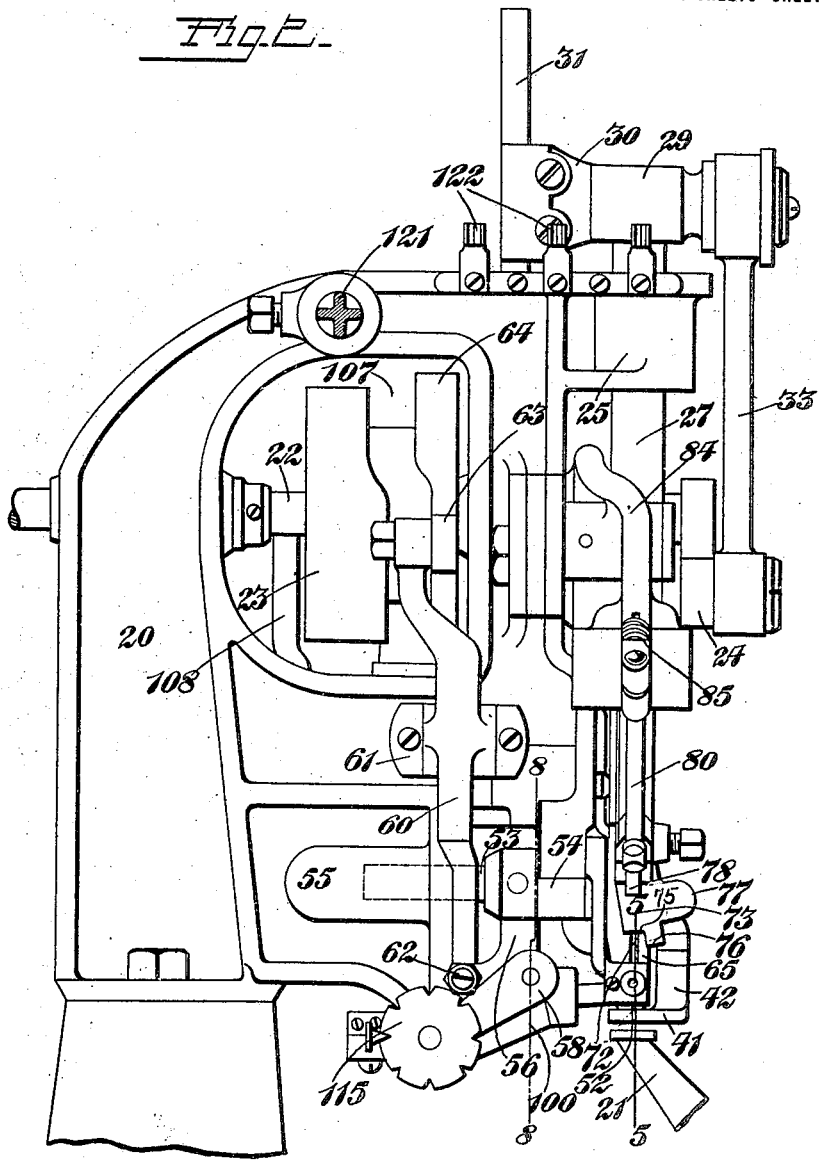
Fig. 2 is a side elevation of the left-hand side of the machine.
Figure 3:
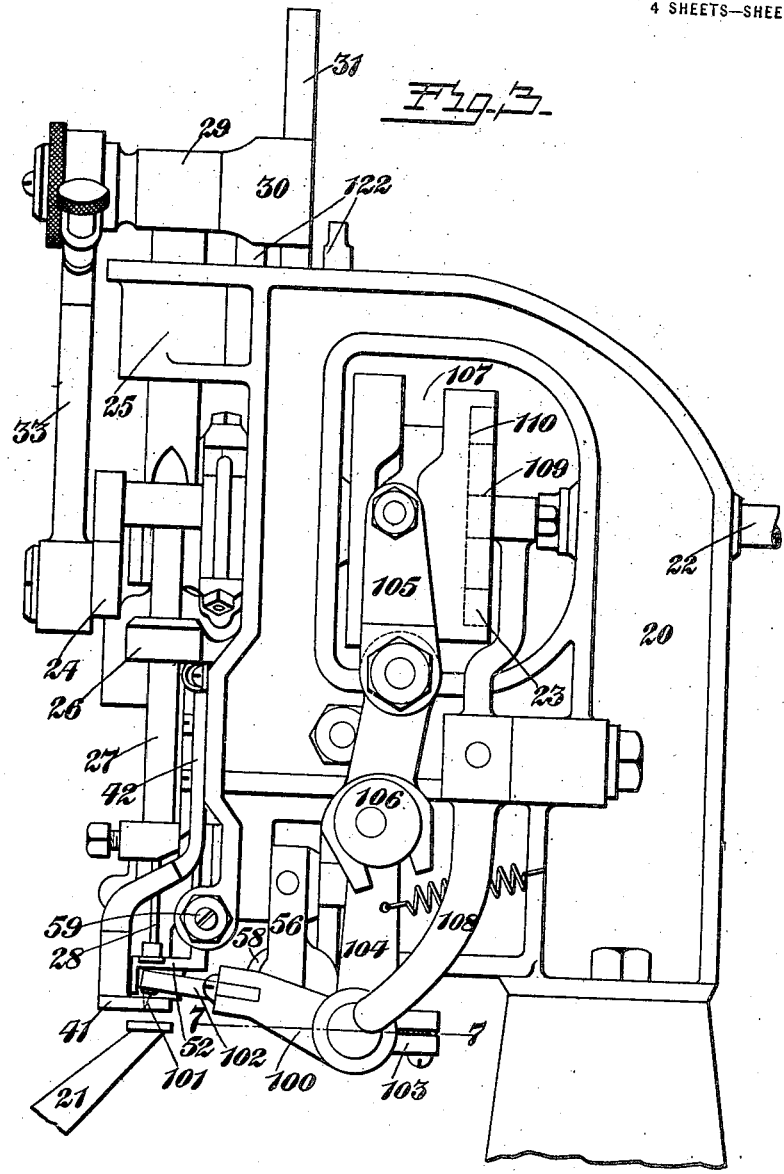
Fig. 3 is a side elevation of the right-hand side of the machine.

Referring to the accompanying drawings, 20 designates the machine head or frame which is bolted upon a pedestal or column as is usual in machines of this type, and 21 designates a horn of usual construction provided with the usual cupped clenching anvil. A main drive shaft 22 is mounted in the head and has rigidly secured thereto a cam wheel 23 and at its forward end a crank 24. The machine is provided with spaced bearing lugs 25 and 26 positioned respectively above and below the drive shaft, and these lugs are bored to form bearings for a driver bar 27. A driver 28 is removably clamped in the driver bar by means of a set screw as shown in the drawings. The upper end of the driver bar is provided with a head 29 which has a rearward extension 30 forked to embrace a guide bar or post 31 on the machine head. A pitman 33 connects the crank 24 with the head 29.

A presser-foot 41 slotted as shown in the drawings is provided with a shank 42 screwed to the head. A driver guide has a shank 43 secured to the head by means of a screw 44 and dowels as shown in Figs. 1, 4 and 6. The lower end of the shank has formed thereon a driver guide 45 which is bored to receive a sleeve 46.

A throat 52 is provided with a shaft 53 supported in spaced bearings 54 and 55 on the machine head. An arm 56 is secured on this shaft and is engaged by a spring pressed plug 57 sliding in a bore 58 in the machine head, and this plug normally tends to rotate the shaft and throat to the right Figs. 1 and 4 into alinement with the driver and into engagement with a stop 59 on the machine head. A lever 60 is supported in bearings 61 on the machine head and is provided at its lower end with an adjustable set screw 62 engaging a laterally extending lug on the arm 56, and at its upper end with a cam roll 63 engaging the cam 64 on the cam wheel 23. The cam and lever operate to positively return the throat into alinement with the driver and into engagement with the stop 59.

A fastener stock guide 65 is provided with an ear 66 having a lug 67 thereon which has a bearing in a bore in the end of the shaft 53 so that the throat and the guide will move about concentric axes. The guide is secured in position by means of a screw 68 extending through the ear and lug and into the shaft 53. An arm or pin 69 is formed on the guide 65 and this arm is held in engagement with a stop 70 on the machine frame by means of a comparatively strong spring 71. The guide is provided with a groove 72 for receiving the string of connected nails. A resilient plate 73 is pivoted at 74 on the guide, and is provided with edge portions 75 and 76 of different lengths adapted to engage the heads of the nails. An ear 77 is formed on the plate so that the plate may be rotated about the screw 74 as an axis to throw either of the edges or portions 75 and 76 over the groove 72. The screw 74 is drawn up tight so that the plate will be held frictionally in either of its adjusted positions. The plate forms a guard adapted to prevent backward movement of the string and for controlling the feed of the fasteners by the feeding and cutting member as hereinafter described. By adjusting this guard the machine may be adjusted for fasteners of different lengths.

A blade 78 sharpened at its end is mounted in the slotted end 79 of an arm 80. A set screw 81 bears against the end of this blade so that this blade may be adjusted in its arm, and it may be locked in adjusted position by means of clamping screws 82. The arm 80 is pivoted at 83 to one end of a lever 84, and a spring 85 is constructed to tend to move this arm in a counter-clockwise direction (Fig. 1) on the lever. The lever 84 is pivoted at 86 upon the machine head, and is provided with a forked end 87 embracing an eccentric 88 on the drive shaft. A tie bolt 89 connects the ends of the fork.

The throat is provided with a depending portion 90 working in the slot in the presser-foot and is cut away or channeled at one side. A block or guide member 91 is pivoted in this cut away portion at 92, and this block is provided with a fin 93 which projects into the driver passage 94 and forms one wall of the driver passage. The block is held with its fin in the driver passage by a spring pressed plug 95 bearing against the block and mounted in a tubular bore of a part 96 secured to the throat. The upper face of the throat is provided with a removable cutting die 97 which has its cutting edge slightly beveled or undercut as shown at 98, Fig. 5. The upper face of the throat and die adjacent the driver passage is curved on the arc of a circle concentric with the throat pivot, and due to the fact that the guide is pivoted on the throat and concentric therewith, the nail will be cut off square, since the cut is substantially at right angles to the nail shank. The die 97 is clamped on the throat by a screw 99, and the bowed construction of the die will cause the die to be firmly clamped on the throat at its cutting edge.

An awl carrier 100 is provided with an awl 101 and has a shank 102 supported to rock and slide in a bearing 103 on the machine head. The awl carrier is rocked from the cam wheel 23 by an arm 104 on the carrier connected through a block 106 with the forked end of a lever 105 pivoted on the machine head, the upper end of the lever having a cam roll engaging a cam groove 107 in the cam wheel. The awl carrier is slid in its bearing by means of a lever 108 pivoted on the machine head and provided at its upper end with a cam roll 109 engaging a face cam groove 110 in the cam wheel. A spring 112 tends to move the awl carrier to the right Figs. 1, 4 and 7. The awl carrier shank is threaded as shown at 113 to receive the threaded shank 114 which extends through the end of the bearing 103, and is provided with a knurled head 115. The carrier is slid in its bearing by means of the lever 108 and is returned by means of the spring 112. Its return movement is however limited by the engagement of the knurled head with the end of the bearing.

The fastener stock, which is in string nail form, is supported from one or more reels mounted by means of a bracket 121 on the machine head. In order to support the free ends of the fastener stock not in use, the machine head has mounted thereon a plurality of clips 122.

The operation of the machine so far described is as follows: The awl carrier is swung to cause the awl to pierce the work by means of the lever 105, and is slid to feed the work by means of the lever 108, the awl when in the work being moved into alinement with the driver to position the awl hole in the line of drive. During the feeding movement of the awl, the throat is moved out of the line of drive by the engagement of the awl carrier therewith, the awl carrier engaging the throat and swinging it to the position shown in Fig. 4, the cam roll 63 being at this time on the low part of the cam 64 to permit such movement. As the throat moves from the position shown in Fig. 1 to the position shown in Fig. 4, the feeding and cutting member 78 moves down and feeds the string of nails into the throat, thereafter the feeding and cutting member is moved to the right Figs. 1 and 4 to cut off the lowermost nail from the string, and thereafter the throat is moved to the right to the position shown in Fig. 1, when the driver descends to drive the nail positioned in the throat, the throat being returned to its position in the line of drive by means of the spring pressed plug 57 and the positively operated cam lever 60. It is thus insured that the throat will be returned into the line of drive before the driver descends so as to obviate breaking of the driver. It will be noted that the feeding and cutting member 78 has a constant stroke. During the first part of its stroke it will move idly over the plate or guard 73, and will then engage the head of the lowermost nail on the string, as the distance between the throat and the edge 75 or 76 is just the length of the nail used.

During the operation of the machine the throat is moved into and out of alinement with the driver and with the string nail guide. The cutter also operates to move the string nail guide to place the groove therein in alinement with the throat, and in the actual operation both the throat and the nail guide move simultaneously toward and from each other. The cutter engages the top face of the throat and is then moved to the right Figs. 1 and 4 to cut the last nail from the string. In Fig. 4 the parts are shown in position just after the nail has been severed. The cutter is now under tension and bears not only with considerable force against the string nail guide, but also upon the upper face of the throat. The driver passage is wider at the top than the point of the nail so as to permit the lowermost nail to start to feed into the throat as the throat and string nail move into coöperative position. If now the throat is moved back to position while the cutter bears thereon the nail positioned in the throat is liable to become misplaced by the cutter, thus causing breakage of the driver.

In accordance with this invention the eccentric 88 and the cam 110 are so constructed and so positioned relatively on the drive shaft and with respect to their fork and cam roll, that the pressure of the cutter on the upper face of the throat will be relieved before the throat starts to swing back into alinement with the driver. This is shown in Fig. 4. In this figure the eccentric is at dead center with respect to its fork and is ready to start to move the lever 84 clockwise. The cam 110 is however, at this time in full engagement with its cam roll 109 and will remain in engagement therewith while the drive shaft turns through a short arc. The lever 84 will therefore be swung on its pivot for a short distance in a clockwise direction before the awl begins to move to the right, and before the throat begins to move back to its position in alinement with the driver. The pressure of the cutter on the throat and on the head of the nail in the driver passage is thus relieved before this throat starts to move back into alinement with the driver. The parts are so arranged as to raise and retract the cutter a short distance from the upper face of the throat before the throat starts to back. As the pressure of the cutter is thus relieved, this cutter will not bear upon the head of the nail in the throat, so that this nail is not displaced when the throat is moved back into alinement with the driver.

In Figs. 9 and 10 is illustrated the operation of cutting a nail from the string or fastener stock. As the lowermost nail 134 from the string 135 is fed into the throat, the angular displacement of the throat with respect to the string nail guide will cause a bend 136 in the string between the lowermost nail and the next one 137 above it and at a point just above the head of the lowermost nail 134. The formation of this bend is important as will hereinafter appear. The bend 136 formed as described above is however curved too much and on too long an arc to be useful and must be partially straightened out; this is accomplished as hereinafter described. As the cutter moves against the die 97, the lowermost nail is severed from the string and the bend 136 will be partially straightened out by the pressure of the cutter bearing against the nail 137 and against the guide 65, which guide is sustained by the spring 71 which is comparatively strong. While the nail 137 has its bent portion partially straightened, the extreme end will remain slightly turned as shown in Figs. 10 and 11. This turn will be even slightly more abrupt than the bend 136, due to the straightening action of the cutter and in part due to the action of the beveled and undercut cutting edge of the die on the string. The cutter 78 does not in this case perform the usual operation of a cutter, but operates rather as a die. The actual cutting is performed by the undercut cutting edge of the die 97. The point of the cutter does not dig into the string, but rather operates to clamp the string and form an abutment shearing edge with respect to the edge of the die 97. The bevel face 138 of the cutter is ground off to such an angle that it is substantially parallel with the edge 139 of the nail. The cutter does not therefore dig into the material, but the actual shearing is performed by the die 97 which coöperates with the cutter in finishing the slight turn on the point of the nail.

The nail as thus formed will have its point slightly but abruptly turned as shown in Fig. 11. This is important in the utilization of a machine for driving fasteners into leather, since it predetermines the direction of the clench of the nail, and will cause the anvil to clench the point in a predetermined direction as shown in Fig. 4. The anvil used with machines of this type is of the ordinary cup-shaped construction, (in which the cup is a segment of a sphere) but this cup-shaped anvil cannot predetermine or control the direction of the clench with any degree of accuracy, but the point of the nail is liable to turn sidewise and over the anvil so as to come out on the side of the shoe, thus ruining the shoe. However, by forming a turned point on the end of the fastener, this turned point will cause and insure that the nail be clenched in the direction given it by this preliminary turn. This is shown in Fig. 4. The turn given to the point of the nail must be slight, and short and comparatively abrupt, otherwise, the nail will curl in the leather. Curling of the nail, even in hard leather is further prevented by firmly supporting the nail against transverse or tipping movement while it is being driven, and by forming an awl hole to receive and guide the nail.

It is obvious that various changes may be made in the details of construction within the scope of the appended claims, without departing from this invention, and it is therefore to be understood that this invention is not to be limited to the specific construction shown and described. It is further obvious that while the machine is especially designed to both form and drive the nails, the machine will form and discharge the nails as formed without driving if the horn and work are removed. These nails so formed can then be utilized in a separate loose nailing machine.

Having thus described the invention what is claimed is:

1. In a machine of the class described, the combination with a fastener stock guide, of means for operating on the fastener stock constructed to cut a fastener therefrom and deflect its point so as to predetermine the direction of its clench by a clenching anvil.

2. In a machine of the class described, the combination with a fastener stock guide, of means for operating on the fastener stock constructed to cut a fastener therefrom and simultaneously deflect the point of the succeeding fastener to predetermine the direction of its clench.

3. In a machine of the class described, the combination with a fastener stock guide, of means constructed and arranged to form a bend in the fastener stock, partially straighten the bend, so as to render the same abrupt, and cut the stock adjacent the bend to form a fastener.

4. In a machine of the class described, the combination with a pair of fastener stock receiving members, of means for moving said members into angular relation to form a bend in the fastener stock and for severing the fastener stock adjacent the bend.

5. In a machine of the class described, the combination with a fastener stock guide, of a fastener receiving member arranged to be placed in angular relation therewith to form a bend in the fastener stock, and means for cutting the fastener stock adjacent the bend, constructed to form a fastener with a deflected point.

6. In a machine of the class described, the combination with a fastener stock guide, of means coöperating with said guide constructed to form a bend in the fastener stock and sever the fastener stock adjacent the bend to form a fastener having a turned or deflected point.

7. In a machine of the class described, the combination with a pair of fastener stock receiving members, of means for moving said members relatively to form a bend in the fastener stock, and means for cutting the fastener stock below the bend, constructed to form a fastener with a deflected point.

8. In a machine of the class described, the combination with a pair of fastener stock receiving members, of means for moving said members relatively to form a bend in the fastener stock, and means for partially straightening the bend so as to render the same abrupt and for cutting the fastener stock below the bend.

9. In a machine of the class described, the combination with fastener supporting means, of means for forming an abruptly bent point on the fastener adapted to predetermine the direction of its clench.

10. In a machine of the class described, the combination with fastener supporting means, of means for bending the point of the fastener adapted to predetermine the direction of its clench.

11. In a machine of the class described, the combination with means for supporting a fastener having a laterally extending head, of means for bending the point of the fastener in the direction of its laterally extending head.

12. In a machine of the class described, the combination with a fastener supporting means, of means for cutting square across the end of the fastener and for bending the point while cutting.

13. In a machine of the class described, the combination with fastener supporting means, of means for simultaneously cutting and bending the point of the fastener.

14. In a machine of the class described, the combination with a plurality of fastener stock receiving members, of means for moving said members relatively to form a bend in the fastener stock, and means for cutting the fastener stock adjacent the bend to form a fastener having an abruptly bent point.

15. In a machine of the class described, the combination with a plurality of fastener stock receiving members, of means for moving said members relatively to form a bend in the fastener stock, and feeding and cutting means for cutting the fastener stock adjacent the bend to form a fastener having an abruptly bent point.

16. In a machine of the class described, the combination with a driver, of a coöperating movable throat, means for guiding a string of connected nails into said throat, feeding and cutting means, constructed and arranged to feed the string into said throat by engagement with the head of a nail on the string, and constructed and arranged to coöperate with said throat to cut the end nail from the string, adapted to position a cut nail in said throat, and means for moving said throat laterally.

17. In a machine of the class described, the combination with a driver, of a coöperating movable throat, means for guiding a string of connected nails into said throat, feeding and cutting means, constructed and arranged to feed the string into said throat by engagement with the head of a nail on the string, and constructed and arranged to coöperate with said throat to cut the end nail from the string, adapted to position a cut nail in said throat, and means for moving said throat laterally, constructed and arranged to support said throat against the action of said cutting means.

In testimony whereof we have hereunto affixed our signatures in the presence of these witnesses.

GEORGE A. DOBYNE.

Witnesses:
WILLIAM R. ROLLINS,
JOSEPHINE A. MURREN.

STEPHEN A. DOBYNE.

Witnesses:
J. H. BRUNINGS,
L. F. MAHLER.